United States Patent [19]

Herlihy

[11] Patent Number: 5,285,816
[45] Date of Patent: Feb. 15, 1994

[54] ONE WAY VALVE

[75] Inventor: Geoffrey F. Herlihy, Perth, Australia

[73] Assignee: Rapid Developments Ltd., Wembley, England

[21] Appl. No.: 963,852

[22] Filed: Oct. 20, 1992

[30] Foreign Application Priority Data

Dec. 11, 1991 [AU] Australia ............................ 88972/91

[51] Int. Cl.⁵ ............................................. F16K 15/16
[52] U.S. Cl. .................................... 137/856; 137/858; 137/527.8
[58] Field of Search .................. 137/515.7, 527.8, 855, 137/856, 858

[56] References Cited

U.S. PATENT DOCUMENTS

| 555,588 | 3/1896 | Spencer | 137/858 |
| 3,208,472 | 9/1965 | Scaramucci | 137/515.7 X |
| 3,289,693 | 12/1966 | Scaramucci | 137/858 |
| 3,292,653 | 12/1966 | Scaramucci | 137/527.8 X |
| 3,292,658 | 12/1966 | Scaramucci | 137/856 |
| 3,295,547 | 1/1967 | Scaramucci | 137/85 , X |
| 3,613,270 | 10/1971 | Welch | 137/858 X |
| 4,063,570 | 12/1977 | Mitchell et al. | 137/527.8 X |

Primary Examiner—John Rivell
Attorney, Agent, or Firm—Robert W. J. Usher

[57] ABSTRACT

A non return valve (10) adapted to be supported between two pipe end flanges (20) has a tubular body (11) with an internal flow passage (12) and a valve seat (15) around the inner end of the inlet opening (13), which is a major segment of a circle, and a flat circular elastomeric valve member (30) having a flexible segment (32) fixed to the seat and an internally reinforced rigid segment (31) located over the seat and normally covering the inlet opening. The rigid part hinges inwardly under upstream fluid pressure to uncover the inner end of the inlet opening but reseats itself when fluid pressure is reversed.

10 Claims, 3 Drawing Sheets

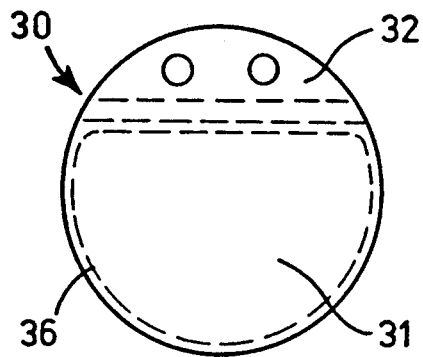
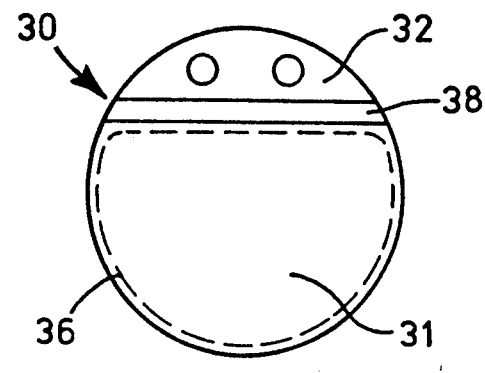
Fig.5  Fig.6
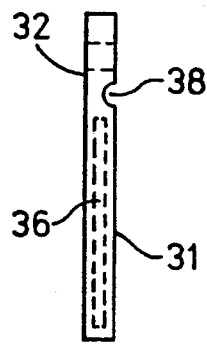
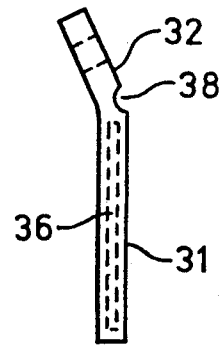
Fig.7  Fig.8

ONE WAY VALVE

BACKGROUND OF THE INVENTION

This invention relates to a one way or non return valve which permits the flow of fluid within a pipe in one direction but prevents flow in the reverse direction and applies in particular to those valves comprising a short tubular body which accommodate a hinged valve member and a seat.

Previously proposed valves of the above mentioned type generally employ for their valve members discs or plates provided with hinges and springs in order that they may pivot. A disadvantage of these constructions is that the springs rust or break and the hinges become clogged with particulate matter present in the fluid resulting in the hinge becoming jammed. A further disadvantage is that the fluid openings are of restricted dimensions due to the configuration required to provide a landing or seat for the valve member resulting in blockages and restriction of fluid flow.

BRIEF SUMMARY OF THE INVENTION

Accordingly it is the object of the present invention to provide a valve of the above type which is resistant to blockages or restriction of fluid flow and which is less liable to the problems associated with hinges and springs.

At its broadest, the invention lies in the novel combinations of the different features described hereinafter.

In one aspect, the invention resides in a non return valve comprising a relatively short tubular body having an internal flow passage extending from a fluid inlet opening at one end to a fluid outlet opening at the other end, with a landing or seat (normally referred to herein simply as a seat) around the inner end of the inlet opening and said inlet opening being substantially in the form of a segment of a circle, and a flat valve member of circular configuration comprising a rigid part and a flexible part supported within the valve body by said flexible part such that said rigid part is located over said landing or seat and normally covers said inlet opening, and wherein said rigid part may hinge inwardly about said flexible part to uncover said inlet opening.

The valve member may be in a single piece and constructed from a suitable elastomeric compound such as rubber, optionally having embedded within the rigid part a reinforcing element made from steel or other suitable material in order to prevent distortion of the valve member when in engagement with the landing or seat and under the influence of fluid back pressure. The reinforcing element may be of similar configuration to the inlet opening but of larger dimensions such that the valve member may overlie the opening. The valve member may be provided with an area of reduced thickness or groove across the downstream side at the junction of the rigid part and the flexible part such that the groove becomes resiliently distorted as the rigid part of the valve member hinges inwardly under the influence of increasing upstream fluid pressure thereby providing a biasing force adapted to urge the rigid part of the valve member sealingly against the seat under conditions of still fluid flow.

The outer periphery of the valve member and the inner periphery of the tubular body are proportioned to each other such that the valve member abuts the inner periphery of the body a few degrees before 90 degrees of inwardly hinged movement of the valve member thereby providing assistance to the return action the moment fluid flow tends to reverse.

In a further embodiment of the invention the flexible part of the valve member is constructed angularly disposed from the rigid part such that a degree of resilient distortion is caused to the grooved section of the valve member upon mounting of the valve member within the body, thereby improving sealing engagement between the valve member and the landing or seat under conditions of low fluid back pressure.

BRIEF DESCRIPTION OF THE DRAWINGS

The invention will be better understood by reference to the following description when read in conjunction with the accompanying drawings wherein:

FIG. 5 is a view of the upstream side of the valve member.

FIG. 6 is a view of the downstream side of the valve member.

FIG. 7 is a side view of the valve member.

FIG. 8 is a side view of a further embodiment of the valve member.

DETAILED DESCRIPTION OF THE DRAWINGS

Figure 1:
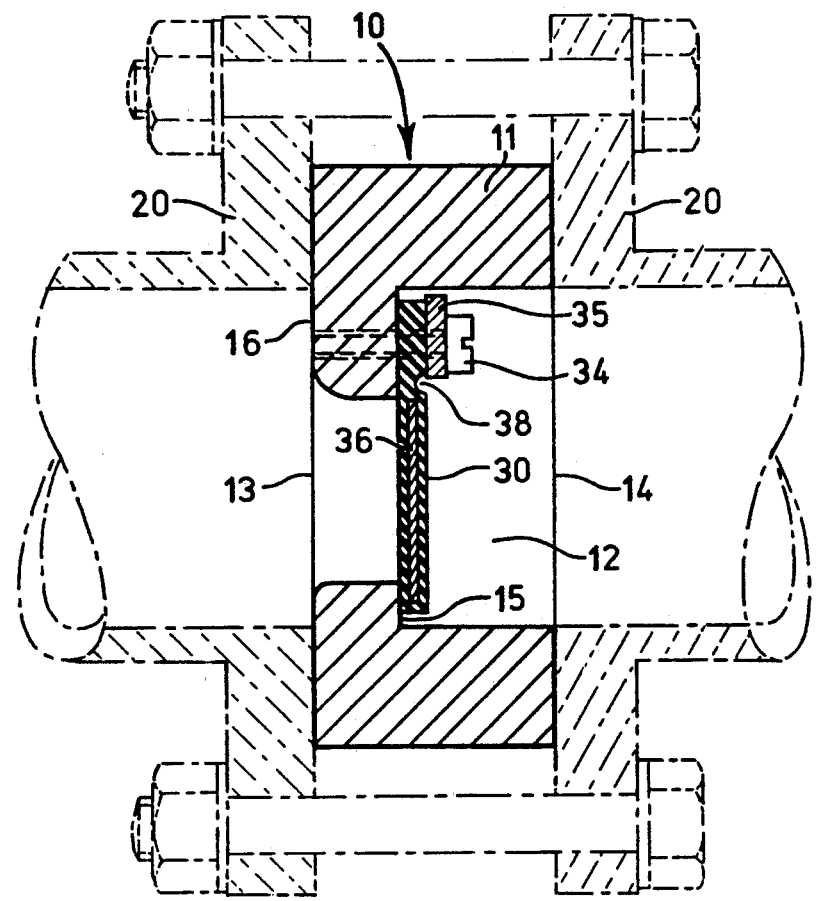
FIG. 1 is a sectional view of one illustrative embodiment of a valve in accordance with the invention in the closed condition, supported between two pipe flanges.
Figure 2:
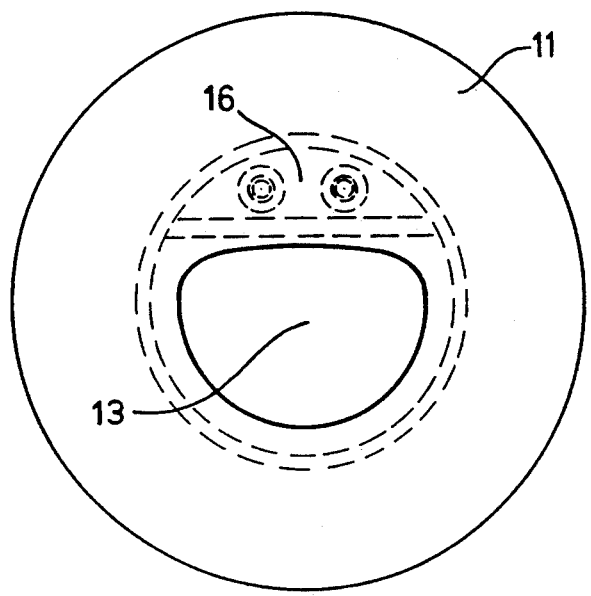
FIG. 2 is a view of the valve looking from the upstream end when in the closed condition.
Figure 3:
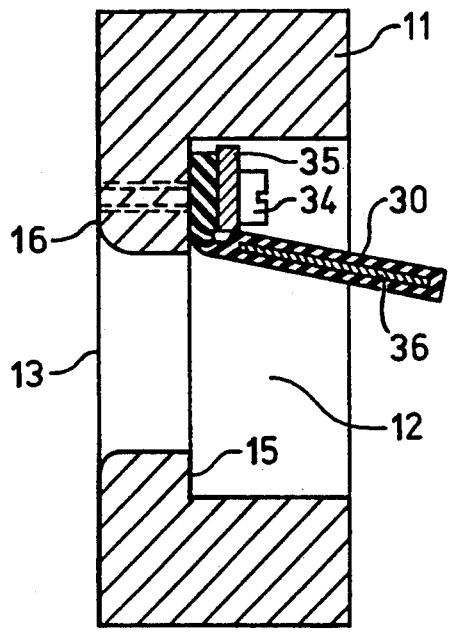
FIG. 3 is a sectional view of the valve in the open condition.

As shown in FIGS. 1 to 7 of the drawings, the valve 10 comprises a tubular body 11, which is short relative to its diameter, supported in fluid flow alignment between the flanges of two pipes 20, and having an internal fluid flow passage 12 provided at one end with a fluid inlet opening 13 substantially in the form of a major segment of a circle and at the other end with a fluid outlet opening 14. At the inlet, the infilling segmental section 16 occupies a minor portion of the circle. A landing or seat 15 is formed from a shoulder around the inner end of the opening 13. A valve member 30 of flat circular configuration comprising a rigid part 31 and a flexible part 32 is supported within the body 11 by screws 34 and retaining plate 35 which releasably clamps the flexible part 31 on that part of the shoulder constituting the landing or seat 15 that corresponds to the infilling segmental section 16, such that the rigid part 31 of the valve member normally covers the opening 13 and wherein the rigid part may hinge inwardly about the flexible part 32.

The valve member 30 is a single disc made from a suitable elastomeric compound such as rubber and incorporating within the rigid part 31 an internal reinforcing element 36 made from steel or other suitable material in order to prevent distortion of the valve member 30 when in engagement with the seat 15 and under the influence of back pressure. The reinforcing element is of similar configuration to the opening 13 but of larger dimensions such that the valve member 30 may overlie the opening 13. The valve member is provided with an area of reduced thickness or groove 38 across its downstream face at the junction of the rigid major segment 31 of the disc and the flexible minor segment 32 of the disc, such that said groove 38 becomes resiliently distorted as the rigid part 31 is hinged inwardly under the influence of increasing upstream fluid pressure, thereby providing a biasing force to bias the rigid part of the valve member sealingly towards and against the seat 15 under conditions of still fluid flow.

The diameter of the valve member 30 and the width of the flow passage 12, which is of circular cross section from the landing or seat 15 to the outlet opening, are proportioned to each other such that the valve member 30 abuts the inner wall of the flow passage 12 a few degrees before 90 degrees of inwardly hinged movement of the rigid part 31, thereby preventing excessive movement of the valve and providing assistance to the return action the moment fluid flow tends to reverse.

In a further embodiment of the invention (FIG. 8) the flexible part 32 of the valve member 30 is constructed so that in the relaxed state it is angularly disposed from the rigid part 31 such that a degree of resilient distortion is caused to the grooved section 38 upon mounting of the valve member 30 within the body 11, thereby improving sealing engagement between the valve member and the landing or seat 15 under conditions of low fluid back pressure.

Figure 9:
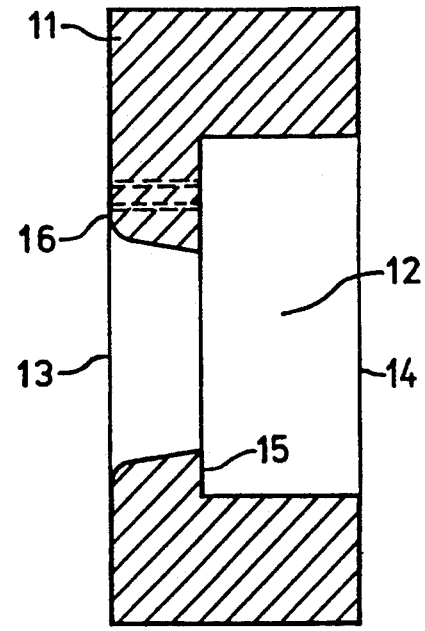
FIG. 9 is a sectional view of a further embodiment of the valve body.
Figure 4:
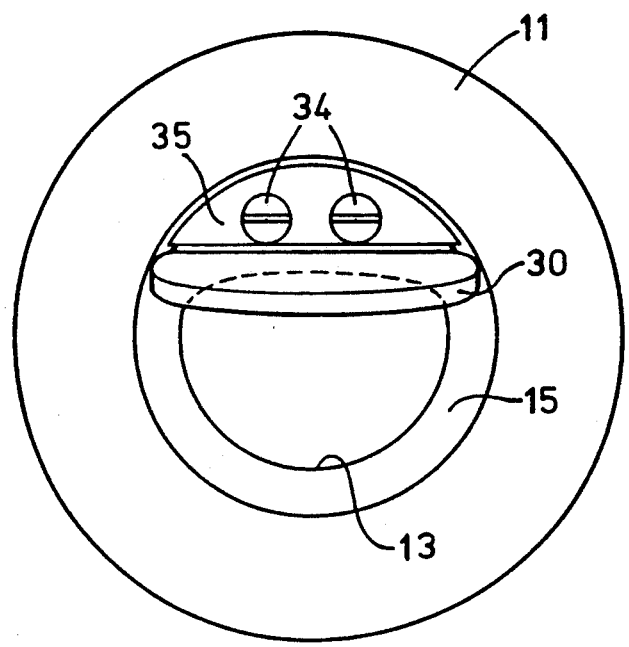
FIG. 4 is a view of the valve looking from the downstream end when in the open condition.

In a further embodiment (FIG. 9) the inlet opening 13 is tapered from the inlet end of the valve body towards the shoulder constituting the seat 15.

It will be appreciated that in the illustrated embodiments the fluid inlet opening 13 is not a geometrically exact circle segment, in that the chord portion is not a straight line and is smoothly merged into the circle arc at its ends. In accordance with the invention, the terms "substantially in the form of a segment of a circle" and the like are intended to include part-circular forms of this general kind.

In this invention it is intended that the valve be installed in a pipe by nipping the body between two flanges of a piping system 20 with the inlet opening facing upstream in the fluid flow. In operation, increasing upstream fluid pressure causes the elastomeric valve member to be flexed inwardly thereby exposing the opening and allowing fluid flow to occur. Should fluid attempt to flow in the reverse direction, the valve element swings inwardly, seating the rigid part across the opening, thereby effectively preventing flow reversal.

The resilient distortion of the elastomeric valve element provides a positive return action without the need for hinges and springs, and the composite rigid construction of that part of the valve element which covers the opening allows a large opening to be used thereby reducing the risk of blocking of the opening by foreign matter present in the fluid.

I claim:

1. A non return valve comprising a relatively short tubular body having a fluid inlet opening at one end of the body and a fluid outlet opening at the other end of the body, an internal flow passage extending through the body from said inlet opening to said outlet opening, said inlet opening being substantially in a form of a major segment of a circle, a seat being formed in said flow passage around an inner end of the inlet opening and perpendicular to the direction of fluid flow, and a flat valve member of circular configuration comprising a rigid part and a flexible part supported within the valve body by said flexible part such that said rigid part is located over said seat and normally covers said inlet opening, and said rigid part is hingeable inwardly about said flexible part to uncover said inlet opening; and the diameter of said circular valve member and the width of said flow passage are proportioned to each other such that said rigid part of said valve member abuts the periphery of said flow passage a few degrees before 90 degrees of inwardly hinged movement of said valve member thereby preventing further inwardly hinged movement thereof.

2. A non return valve as claimed in claim 1 wherein said flow passage is of circular cross section from said seat to said outlet opening.

3. A non return valve as claimed in claim 1 wherein said flat valve member is resiliently biased towards said seat.

4. A non return valve as claimed in claim 1 wherein said valve member is made from an elastomer and said rigid part of said valve member incorporates an internal reinforcing element totally enclosed within the elastomer.

5. A non return valve as claimed in claim 3 wherein said flexible part of said flat valve member is, in the relaxed state, angularly disposed in relation to said rigid part.

6. A non return valve as claimed in claim 1 wherein said valve member is provided with a groove across its downstream face over the junction of said rigid part and said flexible part.

7. A non return valve comprising a relatively short tubular body having a fluid inlet opening substantially in the form of a major segment of a circle at one end thereof and a fluid outlet opening at the other end thereof, an internal flow passage extending through the body from said inlet opening to said outlet opening, a valve seat being formed from a shoulder in said flow passage around an inner end of the inlet opening perpendicular to the direction of fluid flow and said flow passage being tapered from said inlet opening towards said shoulder and being of circular cross section from said shoulder to said outlet opening, and a flat circular elastomeric valve member comprising a rigid part which is a major segment of said circular member incorporating a totally enclosed internal reinforcing element and a flexible part which is a minor segment of said circular member, said valve member being supported within the valve body by said flexible part releasably clamped to said shoulder by a retaining plate such that said rigid part is located over said seat and normally covers said inlet opening, and said rigid part being hingeable inwardly about said flexible part along a groove across the downstream face of the valve member over the junction of said rigid part and said flexible part to uncover said inlet opening, the diameter of said circular valve member and the width of said flow passage being proportioned to each other such that upon hingedly inwardly, said rigid part of said valve member abuts the periphery of said flow passage a few degrees before 90 degrees of inwardly hinged movement of said valve member thereby preventing further inwardly hinged movement thereof.

8. A non return valve comprising a relatively short tubular body having a fluid inlet opening at one end of the body and a fluid outlet opening at the other end of the body, an internal flow passage extending through the body from said inlet opening to said outlet opening, said inlet opening being substantially in a form of a major segment of a circle, a seat being formed in said flow passage around an inner end of the inlet opening and perpendicular to the direction of fluid flow, and a flat valve member of circular configuration comprising a rigid part which forms a major segment of the valve member and a flexible part and supported within the valve body by said flexible part such that said rigid part is located over said seat and normally covers said inlet opening, a hinge being formed in said flexible part at a junction thereof with the rigid part, and at a location spaced apart radially from an axially adjacent inner peripheral wall surface of the flow passage downstream of the seat, so that said rigid part is hingeable inwardly about the hinge to uncover said inlet opening; a diameter of said rigid part being greater than a chordal width of the inner peripheral wall surface of the flow passage at a location corresponding radially to and downstream of the location of the hinge such that said rigid part of said valve member abuts the periphery of said flow passage a few degrees before 90 degrees of inwardly hinged movement of said valve member thereby preventing further inwardly hinged movement thereof.

9. A non return valve comprising a relatively short tubular body having a fluid inlet opening substantially in the form of a major segment of a circle at one end thereof and a fluid outlet opening at the other end thereof, an internal flow passage extending through the body from said inlet opening to said outlet opening, a valve seat being formed from a shoulder in said flow passage around an inner end of the inlet opening perpendicular to the direction of fluid flow and said flow passage being of constant circular cross section from said shoulder to said outlet opening, and a flat circular elastomeric valve member comprising a rigid part which is a major segment of said circular member incorporating a totally enclosed internal reinforcing element and a flexible part which is a minor segment of said circular member, said valve member being supported within the valve body by said flexible part releasably clamped to said shoulder by a retaining plate such that said rigid part is located over said seat and normally covers said inlet opening in engagement with said valve seat, a groove formed across the downstream face of the valve member over the junction of said rigid part and said flexible part and at a location spaced apart radially from an axially adjacent inner peripheral wall surface of the flow passage downstream of the seat, so that said rigid part is hingeable inwardly about the flexible part along the groove to uncover said inlet opening; a diameter of said rigid part being greater than a chordal width of the inner peripheral wall surface of the flow passage at a location corresponding radially to and downstream of the location of the groove such that upon hingeing inwardly, said rigid part of said valve member abuts the periphery of said flow passage a few degrees before 90 degrees of inwardly hinged movement of said valve member thereby preventing further inwardly hinged movement thereof.

10. A non return valve as claimed in claim 9 wherein said flow passage is tapered from said inlet opening toward said shoulder.

* * * * *